May 22, 1951

W. E. NEIMAN 2,554,309

GRAVITY SUPPORTING INTERNAL ATTACHMENT
FOR TELEPHONE HAND SETS

Filed Nov. 26, 1949

INVENTOR.
WILLIAM E. NEIMAN
BY
Carl Miller
ATTORNEY

Patented May 22, 1951

2,554,309

UNITED STATES PATENT OFFICE 2,554,309

GRAVITY SUPPORTING INTERNAL ATTACHMENT FOR TELEPHONE HAND SETS

William E. Neiman, Elmhurst, N. Y.

Application November 26, 1949, Serial No. 129,589

2 Claims. (Cl. 179—157)

This invention relates to a telephone hand set internal attachment and proposes an assembly which may be molded permanently, as a unit, into the hand or grip portion of future newly-manufactured, conventional type, telephone hand set instruments and is applicable to the hand set type which contains a transmitter and receiver as a unitary structure.

An object of the invention is to provide an internal assembly into the hand set frame of any future, newly-manufactured unit so that when the hand set is in operative position on the shoulder, a high specific gravity liquid (mercury) will immediately roll in a plastic or metallic tube of the attachment, from the front to the back of the tube and cause the hand set to rest on the shoulder by gravity and it will therefore, not be necessary to support the hand set with the neck or hands, thus enabling the user to carry on a telephone conversation while both hands are free for writing or referring to various information relative to the telephone conversation.

An important object is to provide a properly balanced gravity type assembly so that when the telephone is replaced on the telephone stand, in inoperative position, the high specific gravity liquid (mercury) will immediately roll in the plastic or metallic tube of the attachment, from the back to the front of the tube, and cause the hand set to balance properly so that the attachment will not pull the hand set from the telephone stand.

Another object of my invention is to provide a hand set assembly that will not slide off the shoulder of the user or require holding by the hands or pressure from the ear while in operative position.

Other objects of the present invention are to provide a gravity supporting internal attachment for a telephone hand set which is simple of construction, having a plastic or metallic tube molded into the connecting handle of the hand set which is light in weight, convenient to use, efficient in operation, has a minimum number of parts, is inexpensive to manufacture and does not in any way interfere with the present design of the hand set or telephone stand.

Other objects of the present invention are to provide a gravity support for a telephone hand set which is of simple construction, which can have molded into the telephone hand set a gravity tube, inexpensive to manufacture, convenient to use, has a minimum number of parts, and efficient in operation.

For other objects and for a better understanding of the invention, reference may be had to the following detailed description taken in connection with the accompanying drawing, in which Fig. 1 is a perspective view of a telephone hand set balanced upon the shoulder of the user.

Figures 1, 2, 3, 4:
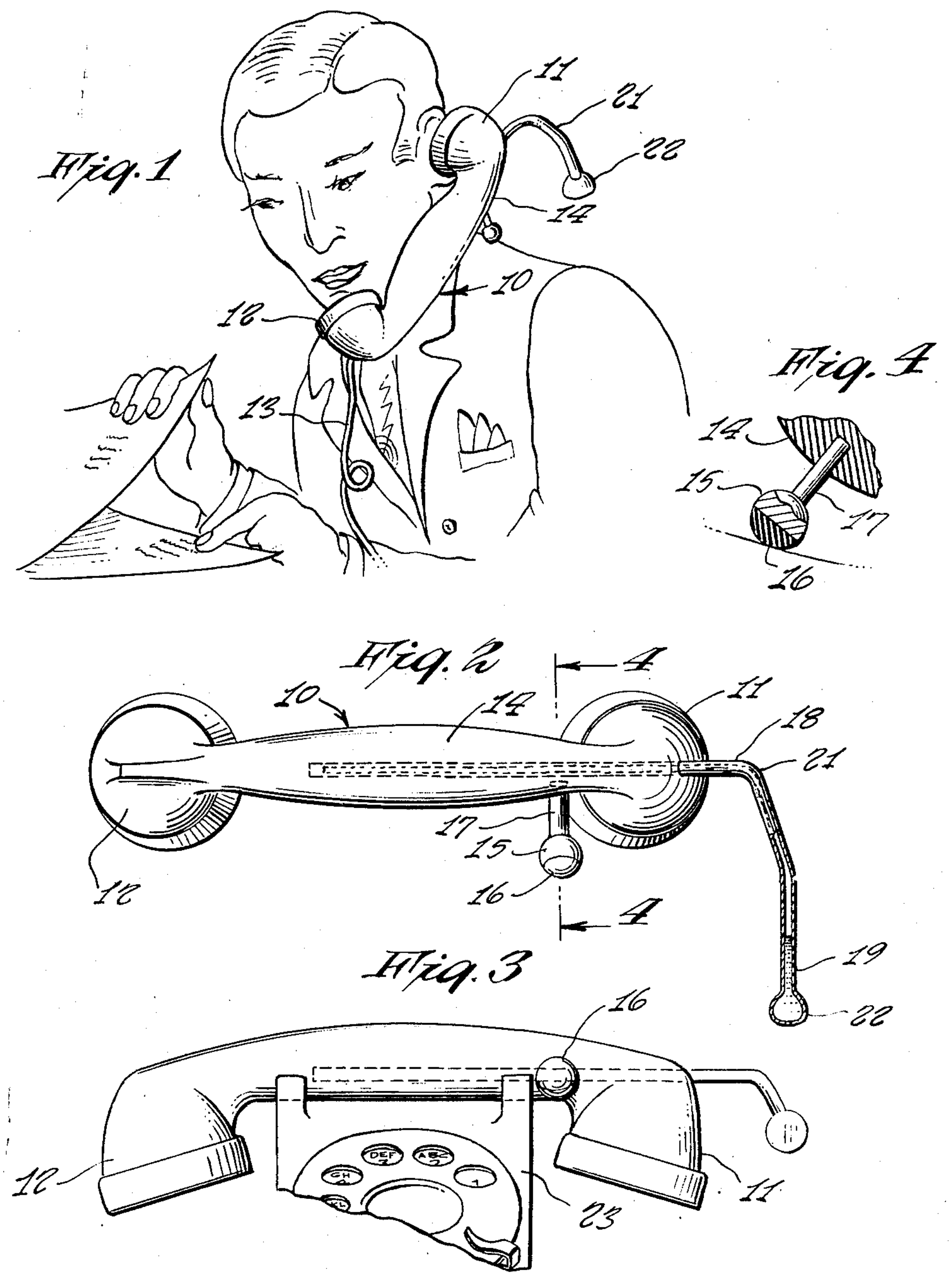
Fig. 2 is a top plan view.
Fig. 3 is a side elevational view of the hand set with the gravity supporting tube balanced upon a telephone stand.
Fig. 4 is a fragmentary sectional view taken on line 4—4 of Fig. 2.

Referring now to the figures, 10 represents a telephone hand set with an ear receiving portion 11 and a transmitting portion 12. A cable cord 13 extends from the transmitting portion 12. These portions 11 and 12 are connected together by a hand or connecting portion 14.

Molded into one side of the connecting portion 14 near to the receiving portion is a shoulder rest 15 having a ball shaped bottom which is rubber covered 16. A shank 17 extends into the hand set connecting portion 14 near receiver portion 11.

Also molded into the connecting portion 14 is a bent hollow tube 18 containing a body of mercury 19. The tube is bent at right angles, as indicated at 21, so that when the hand set is turned up on its side and supported on the shoulder rest 15, the mercury will flow to the outer end of the bent portion in the manner as shown in Fig. 2 and into the enlargement 22 whereby to properly support the hand set upon the shoulder.

When the hand set is not in use upon the shoulder, the mercury will flow back from 22 through the tube 18 and into the handle portion 14 thereof so that the hand set can be properly balanced upon the stand 23, Fig. 3. With the weight of the mercury within the handle, there will be no tendency for the hand set to be upset while on the stand.

The shoulder support 15 is preferably made of light weight aluminum or plastic so as not to interfere with the hand set when balanced upon the stand. The tube 18 is made either of plastic or metal and is easy to mold into the telephone hand set. The tube is light in weight so that a negligible amount of weight is added to the hand set.

It will be apparent that there has been provided a gravity support which will automatically serve to balance the telephone hand set upon the shoulder of the user as the same is brought onto the shoulder.

While various changes may be made in the detail construction, it shall be understood that such changes shall be within the spirit and scope of the present invention as defined by the appended claims.

Having thus set forth and disclosed the nature of my invention, what I claim is:

1. A telephone hand set comprising a receiver and transmitter portion and an interconnecting portion extending between the said receiver and transmitter portions and serving as a hand grip, a shoulder rest extending from the interconnecting portion and adapted to engage with the shoulder of the user of the hand set, a tube extending out of the receiver portion and bent laterally, and shiftable weight means within the tube whereby the hand set may be balanced upon the shoulder support under the weight of the shiftable weight means.

2. A telephone hand set comprising a receiver and transmitter portion and an interconnecting portion extending between the said receiver and transmitter portions and serving as a hand grip, a shoulder rest extending from the interconnecting portion and adapted to engage with the shoulder of the user of the hand set, a tube extending out of the receiver portion and bent laterally and shiftable weight means within the tube whereby the hand set may be balanced upon the shoulder support under the weight of the shiftable weight means, said tube extending into the connecting portion longitudinally thereof to receive the shiftable weight means, said shiftable weight means comprising mercury and the outer end of the laterally bent part of the tube being enlarged to receive a large quantity of the mercury.

WILLIAM E. NEIMAN.

REFERENCES CITED

The following references are of record in the file of this patent:

UNITED STATES PATENTS

| Number | Name | Date |
|---|---|---|
| 1,939,449 | Horn | Dec. 12, 1933 |